United States Patent
Igawa (10) Patent No.: US 7,090,243 B2
(45) Date of Patent: Aug. 15, 2006

(54) AIRBAG APPARATUS

(75) Inventor: Tadahiro Igawa, Hikone (JP)

(73) Assignee: Takata Corporation (JP)

( * ) Notice: Subject to any disclaimer, the term of this patent is extended or adjusted under 35 U.S.C. 154(b) by 0 days.

(21) Appl. No.: 10/403,597

(22) Filed: Mar. 31, 2003

(65) Prior Publication Data

US 2003/0234525 A1 Dec. 25, 2003

(30) Foreign Application Priority Data

Apr. 2, 2002 (JP) .............................. 2002-100133

(51) Int. Cl.
*B60R 21/217* (2006.01)

(52) U.S. Cl. .................... 280/728.2; 280/740; 280/742

(58) Field of Classification Search ............ 280/728.2, 280/730.2, 736, 740–742
See application file for complete search history.

(56) References Cited

U.S. PATENT DOCUMENTS

| | | | |
|---|---|---|---|
| 3,773,352 A * | 11/1973 | Radke | ........................ 280/731 |
| 4,944,527 A | 7/1990 | Bishop et al. | |
| 5,149,130 A * | 9/1992 | Wooley et al. | ............ 280/743.1 |
| 5,393,090 A * | 2/1995 | Shepherd et al. | ........ 280/728.2 |
| 5,405,164 A | 4/1995 | Paxton et al. | |
| 5,611,563 A | 3/1997 | Olson et al. | |
| 5,613,704 A | 3/1997 | White, Jr. et al. | |
| 5,671,945 A | 9/1997 | Rhule et al. | |
| 5,803,486 A | 9/1998 | Spencer et al. | |
| 5,803,488 A | 9/1998 | Bailey et al. | |
| 5,899,485 A * | 5/1999 | Folsom et al. | ........... 280/728.2 |
| 6,336,659 B1 * | 1/2002 | Corrion | ...................... 280/736 |
| 6,419,266 B1 * | 7/2002 | Morfouace et al. | ......... 280/740 |

FOREIGN PATENT DOCUMENTS

| | | |
|---|---|---|
| DE | 29917943 | 2/2001 |
| DE | 19962946 | 7/2001 |
| DE | 20200365 | 7/2002 |
| JP | 09175305 | 8/1997 |
| WO | WO 02/49884 A1 | 6/2002 |

* cited by examiner

*Primary Examiner*—Paul N. Dickson
*Assistant Examiner*—Laura B. Rosenberg
(74) *Attorney, Agent, or Firm*—Fitch, Even, Tabin & Flannery (57) ABSTRACT

To provide an airbag apparatus in which gas from a gas generator can be prevented from directly colliding with an airbag thereof, thereby easing the requirements of heat resistance on the airbag via a gas generator that is inserted through an aperture of an airbag and is fixed to the periphery of the aperture by a band around them. A retaining member is fitted around the gas generator and is fixed to a casing by bolts. Both sides and a lower side of a portion of the gas generator where gas ports are formed are surrounded by side walls and a bottom of the retaining member as a gas-flow deflecting member. Gas spewed through gas ports are prevented from directly colliding with parts of the airbag near the gas ports.

6 Claims, 9 Drawing Sheets

AIRBAG APPARATUS

FIELD OF THE INVENTION

The present invention relates to an airbag apparatus of a motor vehicle for protecting a vehicle occupant and/or a pedestrian in the event of a collision.

BACKGROUND OF THE INVENTION

Airbag apparatus for a motor vehicle is well known which has a gas generator and an airbag. In the event of a vehicle collision, the gas generator is activated to inflate the airbag, thereby protecting an occupant or a pedestrian. Many of gas generators employed in such airbag apparatuses are of a type that at least a part of spewed gas is generated by reaction of a gas generant.

SUMMARY OF THE INVENTION

It is an object of the present invention to provide an airbag apparatus which can prevent gas from directly colliding with the inner surface of an airbag thereof even with a gas generator which spews high-temperature gas, thereby easing the requirements of heat resistance on the airbag.

An airbag apparatus of the present invention comprises an airbag and a gas generator for inflating the airbag, wherein at least a portion of the gas generator where gas ports are formed is disposed inside the airbag, and further comprises: a gas-flow deflecting member for preventing gas spewed through the gas ports from directly colliding with the inner surface of said airbag.

In the airbag apparatus, gas spewed through the gas ports of the gas generator is deflected by the gas-flow deflecting member not to directly collide with the inner surface of the airbag. Therefore, the requirements of heat resistance on the airbag, particularly a portion thereof near the gas ports, are eased.

The airbag apparatus of the present invention further comprises a casing for accommodating said airbag and a retaining member for fixing said gas generator to the casing and it is preferable that the gas-flow deflecting member is integrally formed with the retaining member. According to the airbag apparatus, as the gas generator is fixed to the casing by the retaining member, the gas-flow deflecting member is automatically fixed to the casing. Therefore, the assembly of the apparatus is quite easy.

In one aspect of the present invention, the gas generator is cylindrical and is provided with a plurality of gas ports which are formed in a peripheral surface of the gas generator at intervals in the circumferential direction, and the gas-flow deflecting member faces substantially a half of the gas generator in the circumferential direction and the other half of the gas generator is not surrounded by the gas-flow deflecting member so as to allow gas to flow out.

In the airbag apparatus, the gas from the cylindrical gas generator can be controlled to flow out in a certain direction among the radial directions.

In another aspect of the present invention, the gas generator is cylindrical and is provided with a plurality of gas ports which are formed in a peripheral surface of the gas generator at intervals in the circumferential direction, and the gas-flow deflecting member is a sheet such as cloth wrapping said gas generator and the sheet is flicked by gas spewed through the gas ports so that gas is allowed to flow out through the flicked portion.

In the airbag apparatus of the present invention, a plurality of gas generators may be provided per one airbag and arranged in substantially a straight line and the gas generators are provided with the gas-flow deflecting members, respectively so that the directions of gas flow guided by said gas-flow deflecting members are substantially parallel to each other.

According to the airbag apparatus, even an airbag which is long in the direction of the straight line can be easily uniformly inflated as a whole.

Also in the airbag apparatus, the gas from the cylindrical gas generator can be controlled to flow out in a certain direction among the radial directions.

DETAILED DESCRIPTION OF THE PREFERRED EMBODIMENTS

Hereinafter, embodiments of the present invention will be described with reference to the attached drawings.

Figure 1:
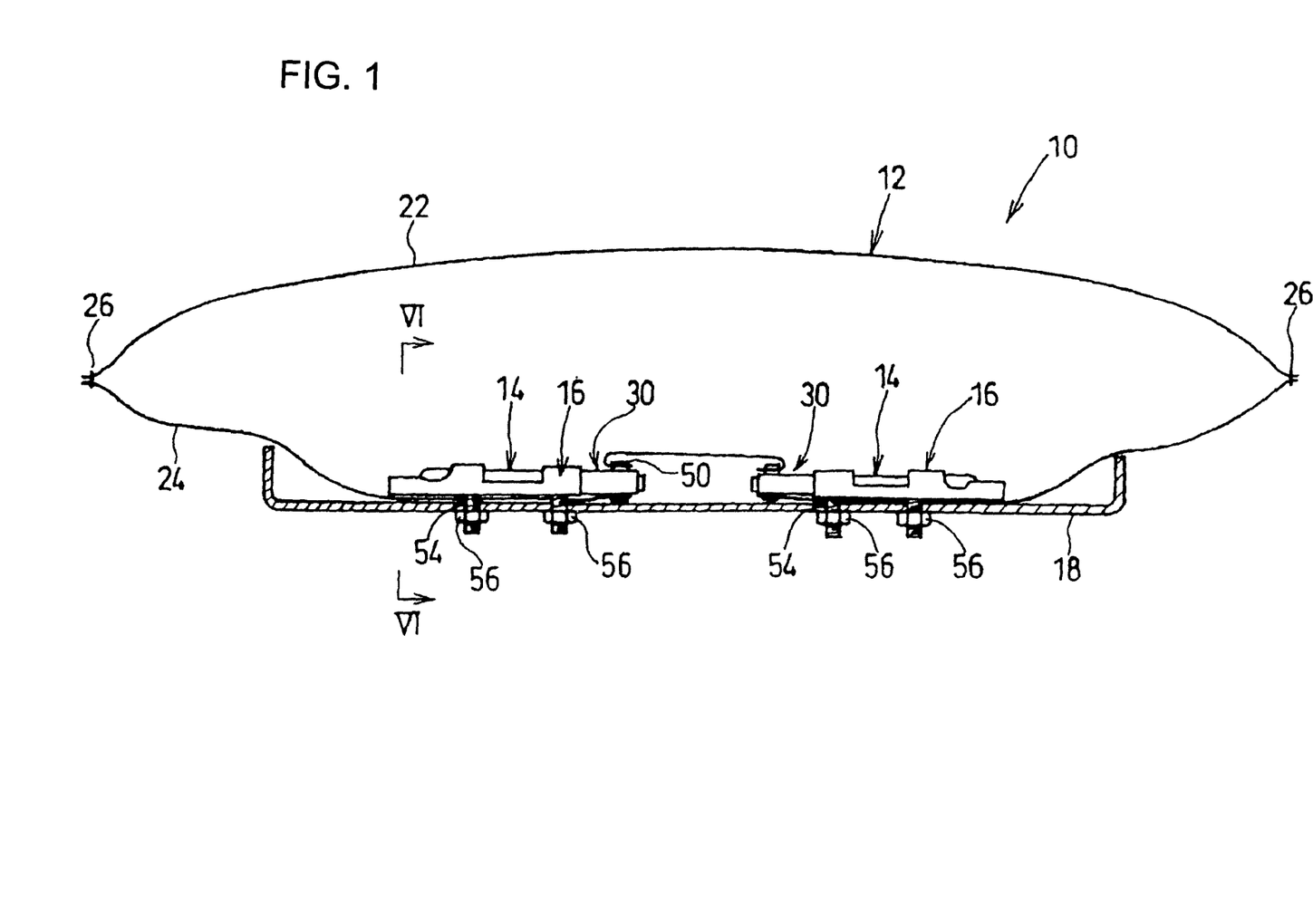
FIG. 1 is a longitudinal sectional view of an airbag apparatus according to an embodiment when an airbag thereof is inflated.
Figure 2:
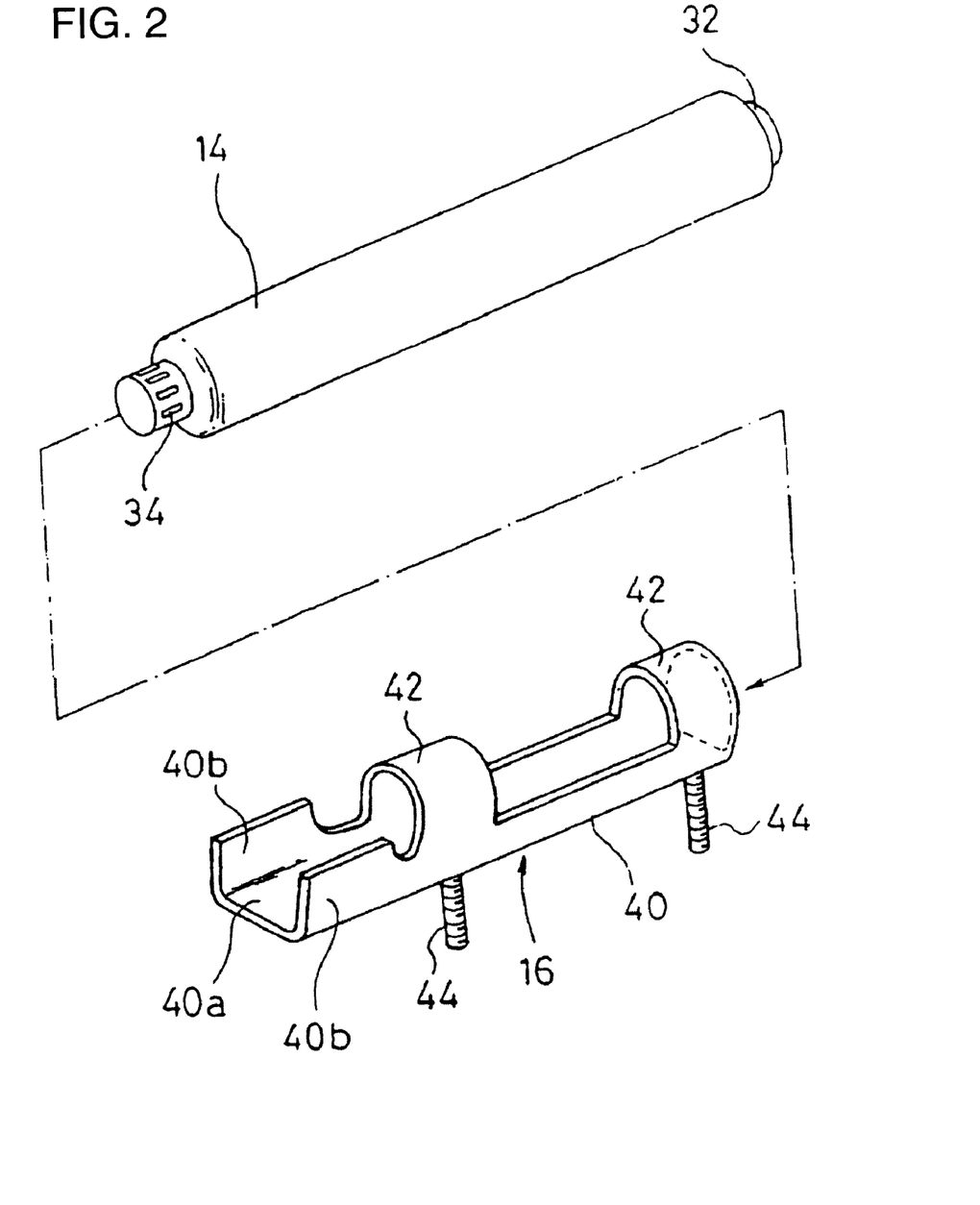
FIG. 2 is an exploded perspective view showing a gas generator and a retaining member for the gas generator of the airbag apparatus.
Figure 3:
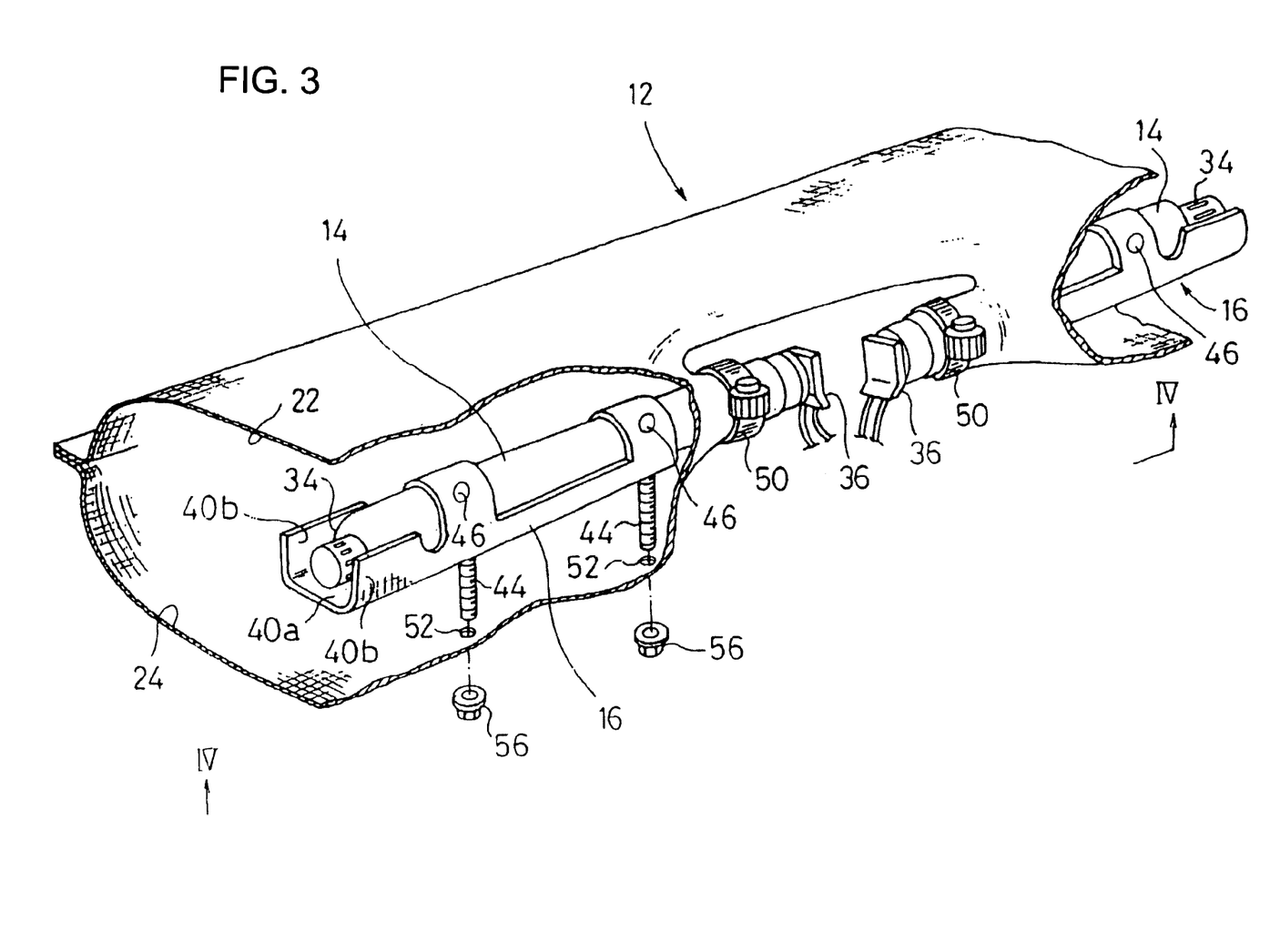
FIG. 3 is a partially broken exploded perspective view of the airbag apparatus of FIG. 1.
Figure 4:
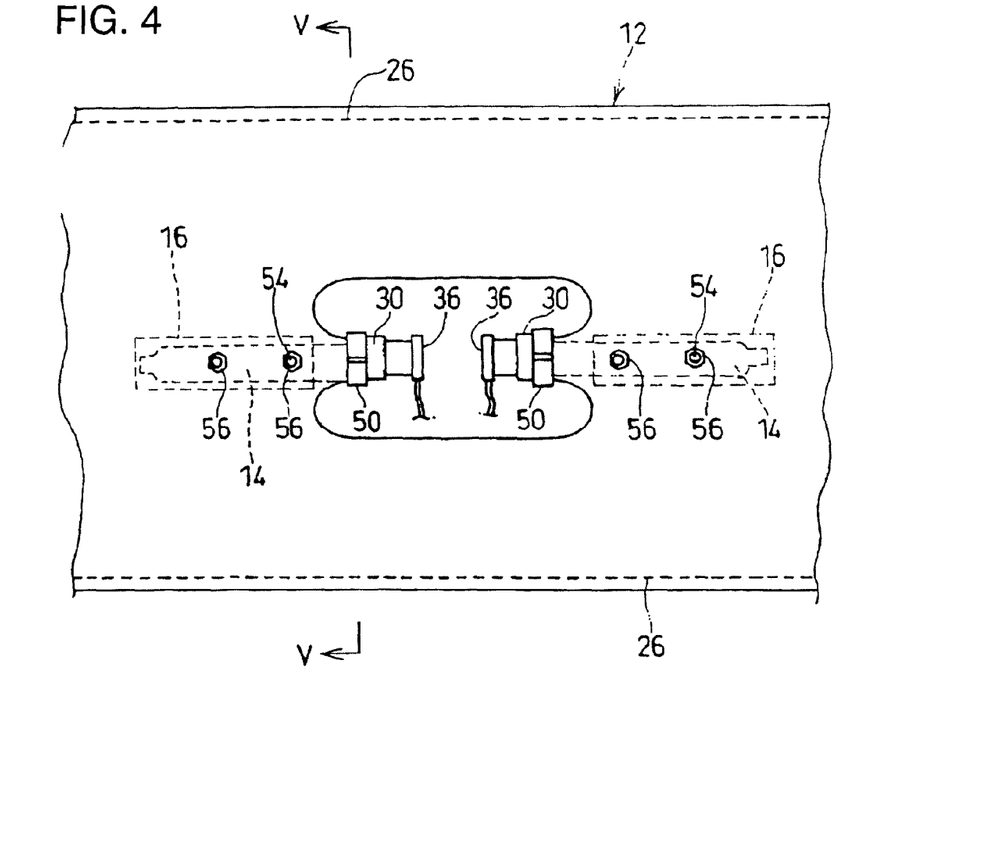
FIG. 4 is a view on arrow IV—IV of FIG. 3 (bottom view of the airbag)
Figure 5:
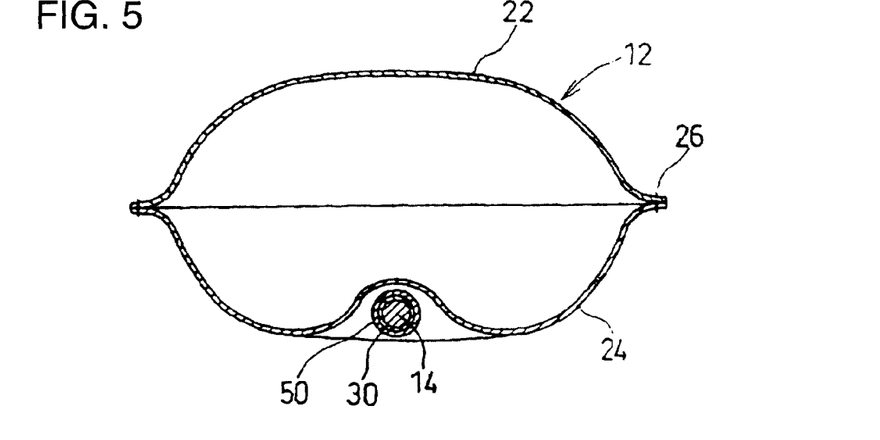
FIG. 5 is a sectional view taken along a line V—V of FIG. 4.
Figure 6:
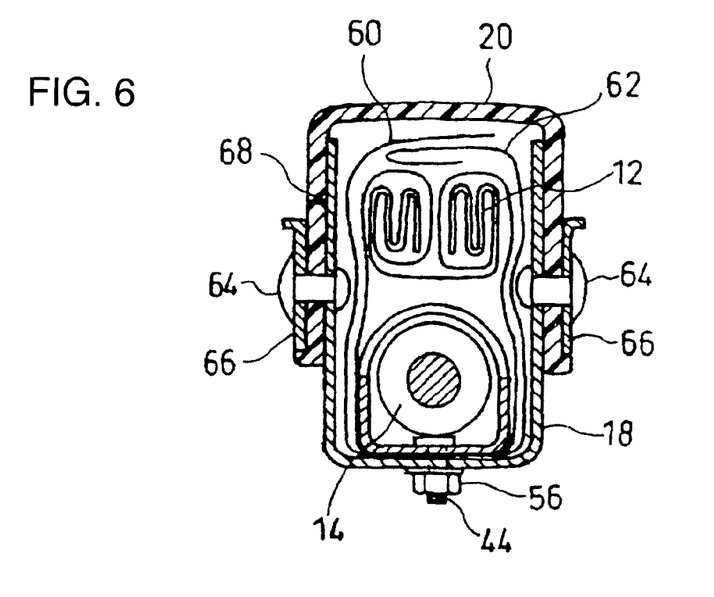
FIG. 6 is a sectional view of the airbag apparatus taken along a line VI—VI of FIG. 1.
Figure 7:
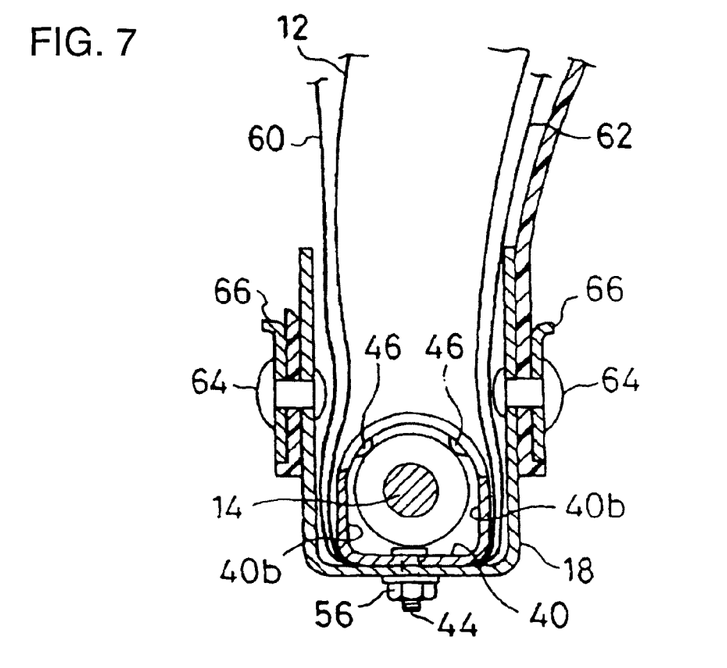
FIG. 7 is a sectional view showing a state that the airbag is inflated from the state shown in FIG. 6.

FIG. 1 is a longitudinal sectional view of an airbag apparatus according to an embodiment when an airbag thereof is inflated, FIG. 2 is an exploded perspective view showing a gas generator and a retaining member for the gas generator of the airbag apparatus, FIG. 3 is a partially broken exploded perspective view of the airbag apparatus of FIG. 1, FIG. 4 is a view on arrow IV—IV of FIG. 3 (bottom view of the airbag), FIG. 5 is a sectional view taken along a line V—V of FIG. 4, FIG. 6 is a sectional view of the airbag apparatus taken along a line VI—VI of FIG. 1, and FIG. 7 is a sectional view showing a state that the airbag is inflated from the state shown in FIG. 6.

The airbag apparatus 10 comprises an airbag 12, gas generators 14 for inflating the airbag 12, retaining members 16 for mounting and fixing the gas generators 14, a casing 18 accommodating the folded airbag 12, and a module cover 20 (FIG. 6) as a lid member attached to the casing 18.

The airbag 12 is an envelope-like member comprising an upper panel 22 and a lower panel 24 which are superposed on each other and sewn together along their peripheral edges by sewing yarns 26. The material of these panels 22, 24 of the airbag may be any of various materials including fabric, synthetic resin film, and the like. In case of synthetic resin film, the panels are preferably connected to each other by adhesive agent or welding instead of the sewing yarns 26.

The lower panel 24 is provided at substantially middle portion with two gas generator insertion apertures 30, 30 so that the apertures 30, 30 face each other.

Each gas generator 14 is cylindrical in this embodiment. The gas generator 14 comprises a cylindrical pressure tight casing filled with gas generant, a squib disposed at one end (rear end) 32 of the casing, and a plurality of gas ports 34 which are formed in a peripheral surface of the other end portion of the casing and arranged at equal intervals in the circumferential direction. The front end portion of the gas generator 14 has a reduced diameter. Connected to the squib is a connector 36 (FIG. 3) so that electrical current is supplied to the squib from a gas generator controlling unit (not shown).

Each retaining member 16 has a body 40 having substantially square-cup-like cross-section, two arches 42 crossing the body 40, and two bolts (stud bolts) 44 projecting from the body 40. The gas generator 14 is inserted through the arches 42 and thus united with the retaining member 16 so that the gas ports 34 are located at one end of the body 40. By forming dents 46 (FIGS. 3, 6, 7) on the arches 42 in this state or by originally forming dents on the retaining member 16 such that a circle including three points of the dents and a projection of the bolt 44 is set to be smaller than the outer diameter of the gas generator and press-fitting the gas generator into the retaining member 16, the gas generator 14 is securely fixed to the retaining member 16.

At the one end portion of the retaining member 16, the body 40 comprises a bottom 40a and side walls 40b, 40b standing on both edges of the bottom 40a so as to form a shape having an upward U-like section and thus has an open top. The bottom 40a and the side walls 40b, 40b compose a gas-flow deflecting member for introducing gas from the gas ports 34 of the gas generator 14 to flow upward.

As shown in FIG. 3, the gas generators 14 secured to the retaining members 16 are inserted together with the retaining members 16 into the airbag 12 through the apertures 30 of the airbag 12, respectively. Only the rear ends of the gas generators 14 are located outside of the airbag 12 and the other portions of the gas generators 14 are located inside the airbag 12. The periphery of each aperture 30 is lapped over the rear end of each gas generator 14 and a band 50 is put around them and clamped, thereby air-tightly fastening the periphery of the aperture 30 to the gas generator 14.

Formed in the lower panel near each aperture 30 are two bolt through holes 52 into which the bolts 44 of each retaining member 16 are inserted.

The aforementioned casing 18 is provided with bolt through holes 54 at positions corresponding to the holes 52.

The bolts 44 are inserted through the holes 54 to project from the bottom of the casing 18. By tightening nuts 56 to the bolts 44, the airbag 12, the gas generators 14, and the retaining member 16 are fixed to the casing 18.

In this embodiment, proximal end portions of guide cloths 60, 62 (FIGS. 6, 7) are also sandwiched between the retaining members 16 and the casing 18. The guide cloths 60, 62 extend along the sides and the top of the folded airbag 12. The ends of the guide cloths 60, 62 are free ends and are superposed on the top of the folded airbag 12. The guide cloths 60, 62 are adapted to guide the airbag 12 not to be caught by any of surrounding parts when the airbag 12 is inflated as shown in FIG. 7.

The module cover 20 covers the open top of the casing 18. The module cover 20 is attached to the casing 18 by rivets 64 via patch plates 66. The module cover 20 is formed with tear lines 68 along which the module cover 20 is torn and opened when the airbag 12 is inflated.

In the airbag apparatus having the aforementioned structure, as a vehicle collision is detected, a squib of the gas generator is energized so that the gas generator 14 is activated to spew gas through the gas ports 34. With the gas, the airbag 12 is inflated and the module cover 20 is torn and opened, whereby the airbag 12 is deployed as shown in FIG. 7.

In this embodiment, the both sides and the lower side of the gas ports 34 are surrounded by the side walls 40b and the bottom 40a of the retaining member as the gas-flow deflecting member. Therefore, gas spewed through the gas ports 34 is prevented from directly colliding with parts of the airbag 12 which are disposed at a very short distance from the gas ports 34 and never or little move apart from the gas ports 34 even after subjected to the gas pressure of spewed gas. Accordingly, the parts of the airbag 12 near the gas ports are not deteriorated by heat. In addition, the gas pressure mainly acts in the inflating direction (upward direction) of the airbag 12, whereby the airbag 12 is rapidly and smoothly inflated.

Figure 8:
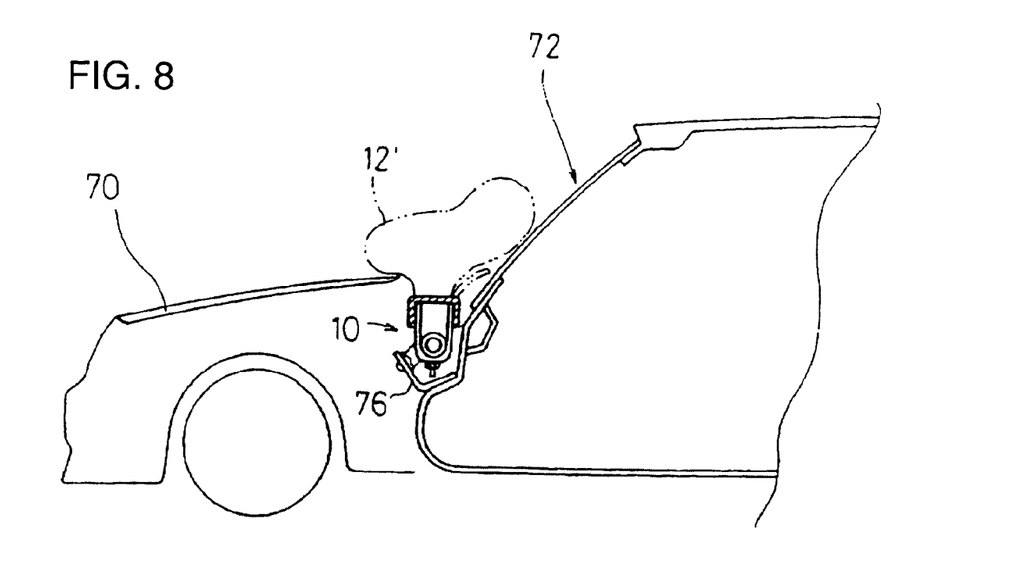
FIG. 8 is a longitudinal sectional view schematically showing an embodiment in which the airbag apparatus is mounted to a motor vehicle.
Figure 9:
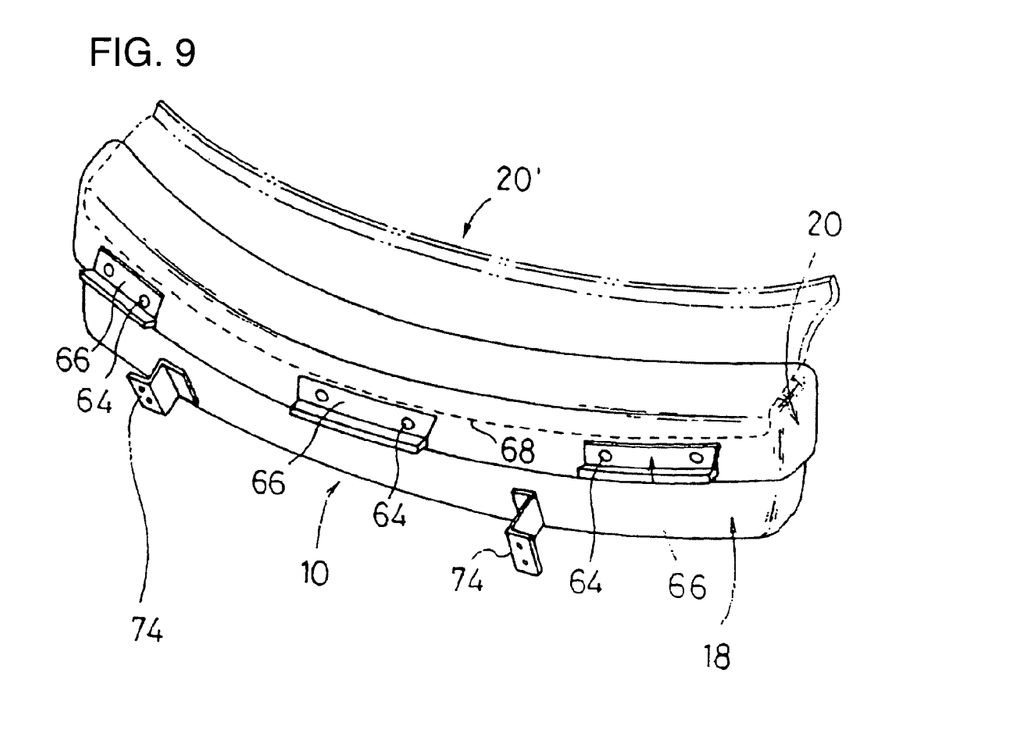
FIG. 9 is a perspective view of an airbag apparatus of a type to be mounted to the motor vehicle.

The airbag apparatus 10 can be used as an external airbag apparatus for protecting a pedestrian and the like as shown in FIGS. 8, 9. FIG. 8 is a longitudinal sectional view schematically showing an embodiment in which the airbag apparatus 10 is mounted to a motor vehicle and FIG. 9 is a perspective view of an airbag apparatus 10 of a type to be mounted to the motor vehicle. The airbag apparatus 10 is mounted to a rear portion of a bonnet (engine hood) 70 of the motor vehicle such that the airbag 12 is adapted to be inflated along a windshield 72 and A-pillars at both sides of the windshield 72. The airbag apparatus 10 has mounting brackets 74 attached to the casing 18. The mounting brackets 74 are connected to a vehicle member 76, thereby fixing the airbag apparatus 10 to the motor vehicle. Numeral 20' in FIG. 9 indicates a state in which the module cover 20 is opened.

The airbag 12 has such a long length as to extend over the whole width of the windshield 72. As shown in FIGS. 1 and 3, the cylindrical gas generators 14, 14 are arranged linearly so that gases are spewed from the respective gas generators 14, 14 upwardly and parallel to each other, thereby substantially uniformly inflating the airbag 12 entirely.

Since the cylindrical gas generators 14, 14 are arranged linearly, the airbag 12 can be folded into a long and thin form extending in the laying direction of the gas generators 14, 14.

Figure 10:
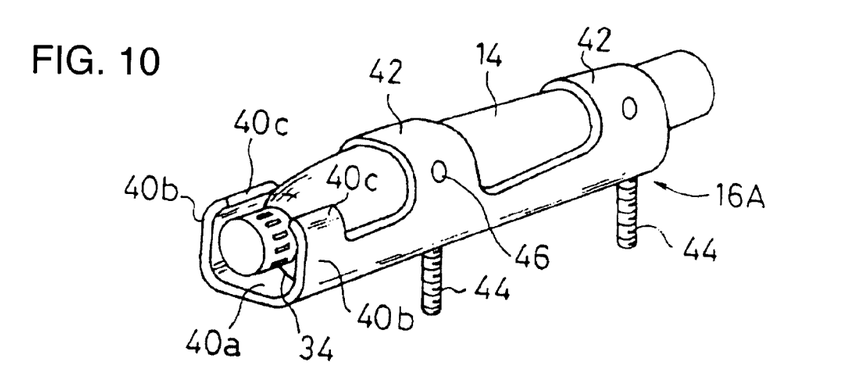
FIG. 10 is a perspective view of a retaining member for a gas generator according to another embodiment of the present invention.
Figure 11:
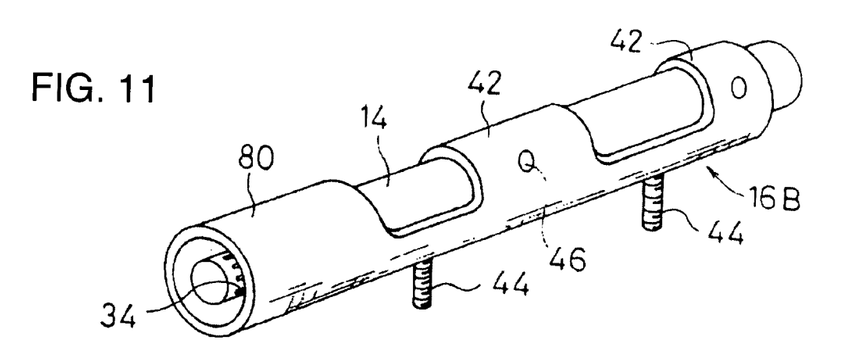
FIG. 11 is a perspective view of a retaining member for a gas generator according to another embodiment of the present invention.
Figure 12:
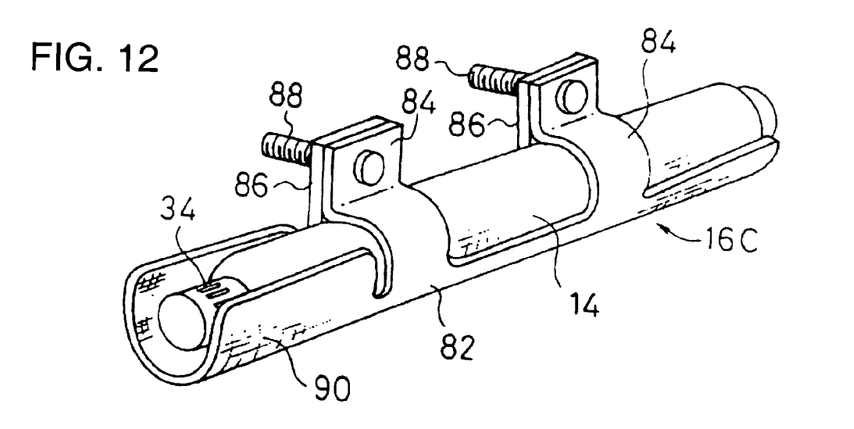
FIG. 12 is a perspective view of a retaining member for a gas generator according to another embodiment of the present invention.

FIGS. 10–12 are perspective views of retaining members 16A, 16B, 16C according to different embodiments of the present invention, respectively. The retaining member 16A of FIG. 10 further has bent portions 40c which are formed by slightly bending the ends of the side walls 40b, 40b toward each other. The bottom 40a, the side walls 40b, 40b and bent portions 40c, 40c compose a gas-flow deflecting member.

The retaining member 16B of FIG. 11 has a cylindrical gas-flow deflecting member 80 which surrounds all around the end portion of the gas generator 14. Other components of the retaining members of FIGS. 10 and 11 are identical to those of the aforementioned retaining member 16 and such identical components are indicated by the same numerals.

The retaining member 16C of FIG. 12 has a body 82 having a substantially semicylindrial shape, and band portions 84, 86 extending from the side edges of the body 82. The gas generator 14 is inserted into the body 82 and the band portions 84, 86 are superposed on each other and clamped together by bolts 88, thereby securely fixing the gas generator 14 to the retaining member 16C. The bolts 88 are fixed to a side portion of the casing 18 (not shown in FIG. 12). That is, the bolts 88 penetrate the side portion of the casing and nuts are screwed from the ends of the bolts 88 and tightened, thereby clamping the band portions 84, 86 and also fixing the retaining member 16C to the casing 18. The respective number of the band portions 84, 86 are two.

One end portion of the retaining member 16C is formed in a shape having a U-like cross-section to surround the both sides and the lower side of the gas generator 14. This portion is defined as a gas-flow deflecting member 90.

Figure 13:
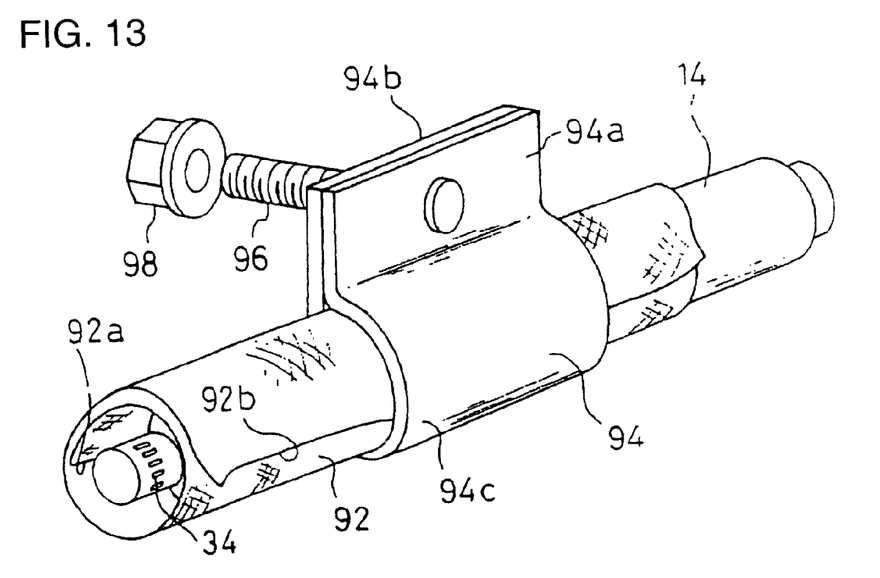
FIG. 13 is a perspective view of a gas generator having a gas-flow deflecting member to be used in an airbag apparatus according to still another embodiment of the present invention.
Figure 14:
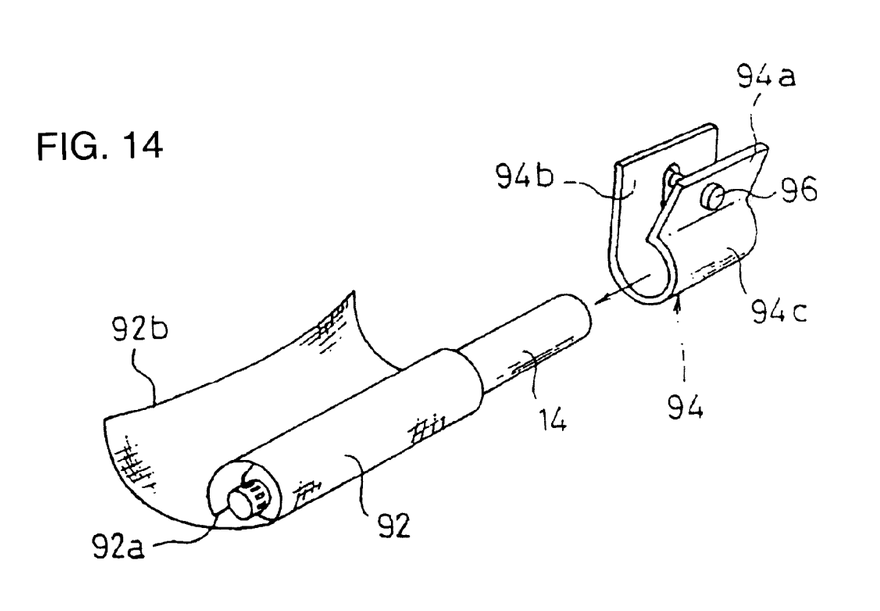
FIG. 14 is an exploded view showing the structure of the gas generator of FIG. 13.
Figure 15:
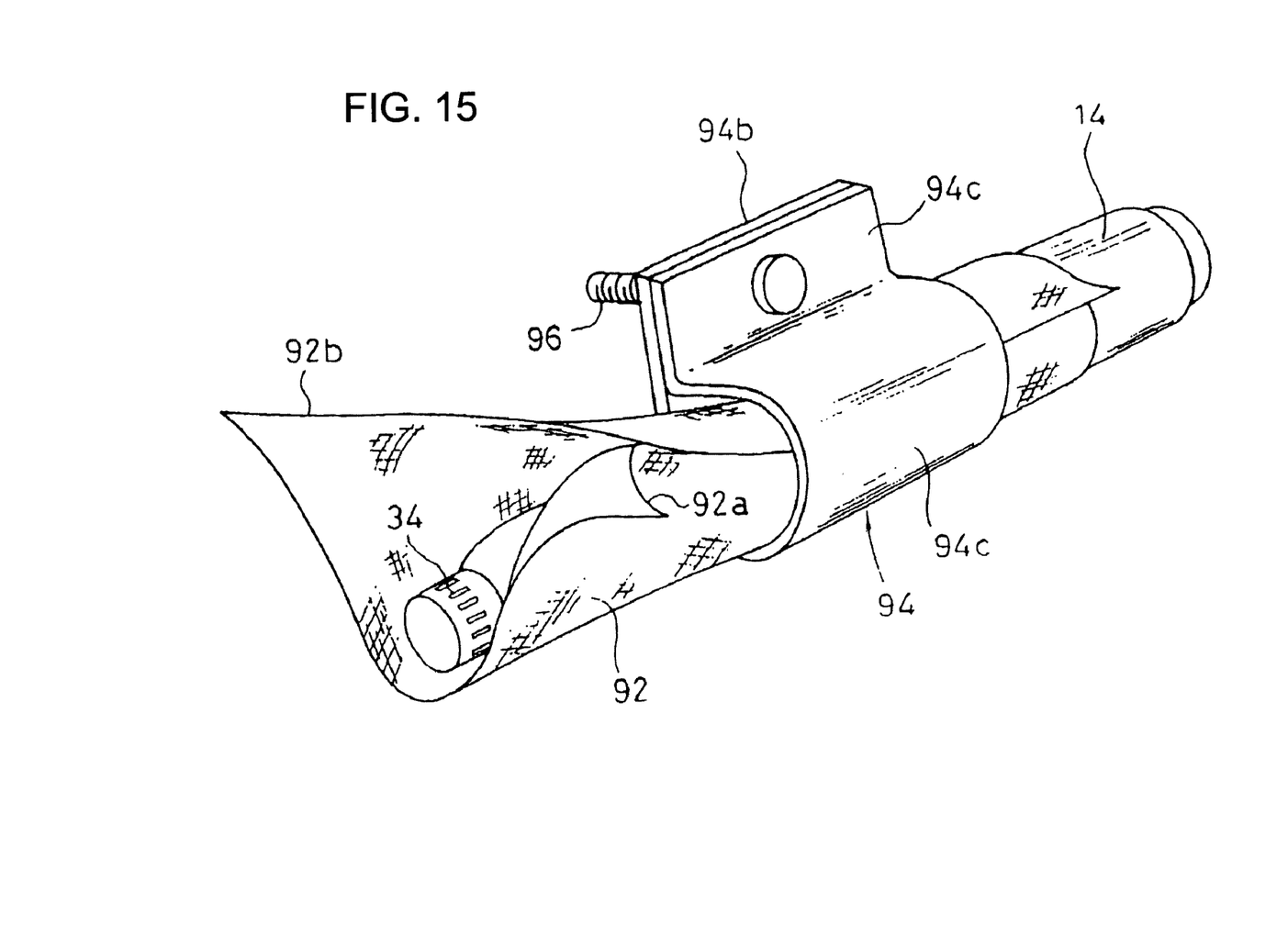
FIG. 15 is a perspective view of the gas generator of FIG. 13 in operation.

FIG. 13 is a perspective view of a gas generator having a gas-flow deflecting member to be used in an airbag apparatus according to another embodiment of the present invention, FIG. 14 is an exploded view showing the structure of the gas generator of FIG. 13, and FIG. 15 is a perspective view of the gas generator in operation.

In this embodiment, the gas generator 14 is wrapped by a sheet such as cloth, preferably, a heat resistant cloth 92. The cloth 92 of this embodiment is substantially rectangular of which one side edge 92a is positioned on one side of the gas generator 14 and the other side edge 92b is positioned on the other side of the gas generator 14. The cloth 92 wraps at least a portion of the gas generator 14 from the front end to the middle. The cloth 92 wraps the gas generator 14 by one full and half arc.

After the cloth 92 is wrapped around the gas generator 14, a C-like portion 94c of a band-like bracket 94 is put around them. The bracket 94 comprises the C-like portion 94c and flanges 94a, 94b extending from the both ends of the C-like portion 94c. The flanges 94a, 94b are superposed on each other and then clamped together by a bolt 96 and a nut 98. The bracket 94 tightens the cloth 92 and is fixed to the gas generator 14.

The bracket 94 is fixed to the casing 18 (not shown in FIGS. 13–15) similarly to the retaining member 16C by the bolt 96 and the nut 98. The cloth 92 surrounds the outer periphery of the portion where the gas ports 34 are formed. As the gas generator 14 is activated, the cloth 92 is flicked by gas spewed through the gas ports 34 and the turn of the cloth 92 around the gas ports 34 is loosened so that the cloth 92 becomes a U-like shape as shown in FIG. 15. Therefore, the gas from the gas ports 34 flows out upward in FIG. 15. Since the cloth 92 exists on the both sides and lover side of the gas generator 14, gas spewed through the gas ports 34 is prevented from directly colliding with parts of the airbag 12 (not shown in FIGS. 13–15) which are disposed near the gas ports 34.

The above embodiments are illustrative examples of the present invention. It should be understood that the present invention may have another form different from the examples shown in the attached drawings. The airbag apparatus of the present invention can be adopted to various types of airbag apparatuses such as an airbag apparatus for front passengers and a curtain airbag apparatus.

As described above, according to the present invention, gas from a gas generator can be prevented from directly colliding with an airbag, thereby easing the requirements of heat resistance on the airbag.

What is claimed is:

1. An airbag apparatus comprising:
   an airbag of flexible material;
   a casing for the airbag;
   a gas generator having an elongate configuration including opposite, spaced ends that are both entirely within the casing;
   gas outlet ports of the gas generator adjacent only one of the ends thereof with the ports disposed in the airbag closely adjacent to the material thereof;
   a gas flow deflecting member mounted between the gas outlet ports and the adjacent airbag material to direct high temperature gas flowing out from the ports in a direction away from the adjacent airbag material and in which direction the airbag is inflated; and
   a retaining member that mounts the gas generator to the casing with the retaining member entirely within the airbag and a portion of the gas generator adjacent the other end opposite the gas ports disposed outside the airbag.

2. The airbag apparatus of claim 1 wherein the retaining member is integrally formed with the gas flow deflecting member.

3. The airbag apparatus of claim 1 wherein the gas generator has a cylindrical configuration with the gas ports spaced circumferentially about the one end thereof, and the gas flow deflecting member extends circumferentially about approximately one half of the generator end including the gas ports so that gas flow from the ports disposed on the other half of the generator end does not impinge against the deflecting member.

4. The airbag apparatus of claim 1 wherein the gas flow deflecting member has a predetermined rigid configuration that opens in the direction away from the adjacent airbag material.

5. The airbag apparatus of claim 1 wherein the gas flow deflecting member comprises cloth material wrapped about the gas outlet ports with the cloth material unwrapping upon actuation of the gas generator to direct gas flow away from the adjacent airbag material.

6. The airbag apparatus of claim 1 wherein the gas generator comprises a plurality of aligned generators and the gas flow deflecting member comprises a plurality of deflecting members each associated with one of the generators and configured so that gas flows from the generators into the airbag in directions that are generally parallel to each other.

* * * * *